United States Patent [19]

Kline et al.

[11] Patent Number: 4,647,778
[45] Date of Patent: Mar. 3, 1987

[54] CLEAR APERTURE CRYOSTAT FOR AN INFRARED DETECTOR

[75] Inventors: Mark L. Kline, Fullerton; Oakley G. Ross, Paso Robles, both of Calif.

[73] Assignee: General Dynamics, Pomona Division, Pomona, Calif.

[21] Appl. No.: 693,918

[22] Filed: Jan. 23, 1985

[51] Int. Cl.⁴ .............................................. G01J 5/06
[52] U.S. Cl. .................................... 250/352; 250/332; 62/514 JT
[58] Field of Search .............. 250/352, 330, 370 L, 250/332; 62/514 R, 514 JT

[56] References Cited

U.S. PATENT DOCUMENTS

| | | | |
|---|---|---|---|
| 2,920,205 | 1/1960 | Choyke | 250/330 |
| 2,990,699 | 7/1961 | Dennis | 62/511 |
| 3,006,157 | 10/1961 | Haettinger | 62/259 |
| 3,018,643 | 1/1962 | Evers | 62/467 |
| 3,095,711 | 7/1963 | Wurtz | 62/514 |
| 3,415,078 | 12/1968 | Liston | 62/514 |
| 3,602,714 | 8/1971 | Farmer et al. | 250/352 |
| 3,942,010 | 3/1976 | Peterson et al. | 250/352 |
| 4,178,775 | 12/1979 | Smetana | 62/514 JT |
| 4,262,200 | 4/1981 | Guy | 250/352 |
| 4,457,730 | 7/1984 | Berry et al. | 62/223 |

Primary Examiner—Carolyn E. Fields
Attorney, Agent, or Firm—Neil F. Martin; Edward B. Johnson

[57] ABSTRACT

A cooling apparatus for an infrared up-convertor incorporates a transparent heat sink in a conductive heat exchange relationship with a surface of the up-convertor and a Joule-Thomson effect cryostat located outside of the incoming and emitted image paths for cooling the heat sink. In this manner, the cooling apparatus does not obscure the path of the image to or from the up-convertor.

6 Claims, 3 Drawing Figures

U.S. Patent  Mar. 3, 1987  4,647,778
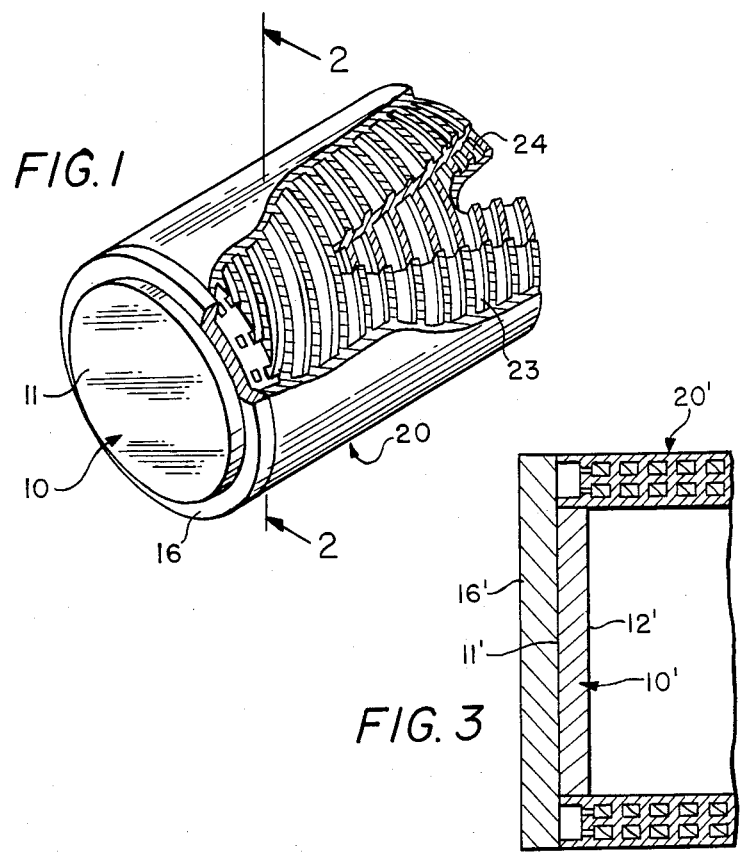
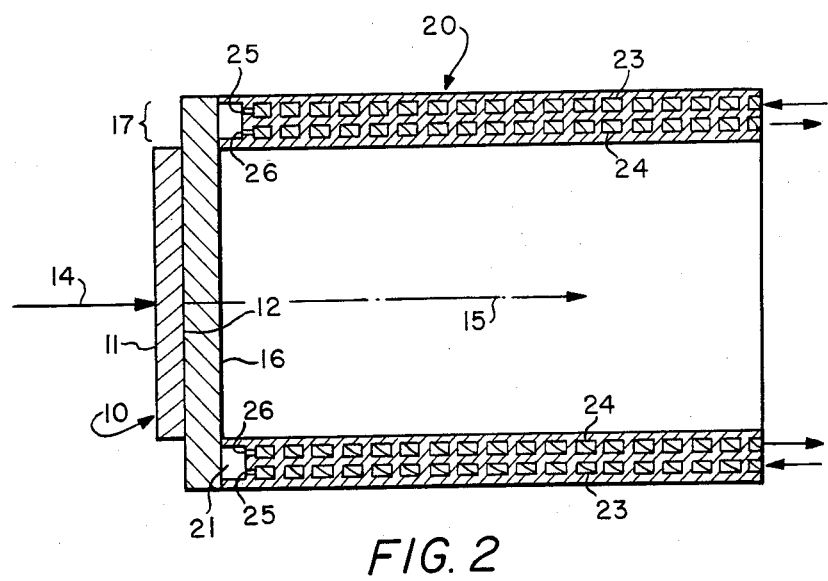

CLEAR APERTURE CRYOSTAT FOR AN INFRARED DETECTOR

BACKGROUND OF THE INVENTION

Infrared detectors, useful for detecting the location of objects by the infrared energy radiating from the objects, are known in the prior art. For example, infrared detectors are used to guide weapons to a target, particularly ground-to-air and air-to-air missiles, and are used in scopes to enhance night-time observation.

Infrared up-convertors are solid-state electronic arrays that receive an infrared image on one surface and emit a corresponding image at a selected wavelength from another surface. If an up-convertor is disk-shaped, an infrared image is focused onto one side and the other side emits a corresponding image, usually at a shorter wavelength. In some applications the emitted image is directly viewed by a human observer or a camera. In other applications the image may be further processed by a device such as a computer.

Infrared-sensitive devices, including up-convertors, are preferably operated at very low temperatures such as 80° Kelvin. At such low temperatures, up-convertors operate most effectively and have increased sensitivity and increased signal-to-noise ratio. Because infrared detectors are typically installed on aircraft, missiles, and other mobile devices and because the detector itself is often gimbal-mounted for tracking objects, the cooling apparatus must not only provide low temperatures but must be relatively small in mass and size and must be able to operate in varied attitudes. It has been found that a cryostat based on the Joule-Thomson effect can meet these requirements.

In a Joule-Thomson cryostat a flow of high-pressure coolant gas, such as nitrogen or argon at, for example, 2000–3000 pounds per square inch, is throttled. The adiabatic cooling upon expansion converts the coolant to a liquid state, or possibly even to a solid state. The low temperature of the coolant is then used to cool the infrared detector. Typically, the expansion-cooled outgoing coolant is used to cool the incoming coolant.

Previously, however, it has not been possible to use up-convertors to their fullest advantage because there was no adequate cooling method which did not intefere with the incoming or outgoing energy; that is, the prior art cooling apparatuses blocked or obscured the path of light to or from the up-convertor. In the prior art the coolant has been used to cool the entire surface of the up-convertor convectively. This has several disadvantages. In convective cooling the light energy must pass thru the coolant, therefore a coolant with a refractive index of anything other than 1 will disturb the focusing of the image. Additionally, turbulence, swirls, and eddies in the convective coolant will cause distortion of the image. Also, near this temperature and pressure it is often very difficult to control the exact nature of the coolant, and slight temperature and pressure variation may produce localized gas, liquid, "ice" or "snow" with the concomitant differing physical qualities which greatly disrupt the image path and disturb the image.

Therefore is is desirable to have a cooling apparatus for an infrared up-convertor which does not obscure the path of energy to or from the up-convertor.

It is also desirable that such a device be small in size and mass and be operable in various attitudes.

SUMMARY OF THE INVENTION

According to the present invention, an infrared sensitive device includes an up-convertor and a cooling assembly for the up-convertor that does not obscure or disrupt the path of energy to or from the up-convertor. The up-convertor has a receiving surface for receiving an infrared image and an emitting surface for emitting a corresponding image at a selected wavelength. The cooling assembly comprises a heat sink which is attached to and covers a surface of the up-convertor and which is in a heat exchange relationship with the surface of the up-convertor for conducting heat away from the up-convertor. The heat sink is transparent to the wavelength of the energy. A cryostat, located outside of the path of energy, cools the heat sink. In the exemplary embodimnet, the up-convertor and cooling assembly are designed to fit in a circular cylinder. One side of the disk-shaped up-convertor is a receiving surface for receiving an infrared image. The opposite side is an emitting surface for emitting a corresponding image at a selected wavelength. The emitter side of the up-convertor is attached to, supported by, and conductively cooled by a disk-shaped heat sink. the transparent heat sink is of larger diameter than the emitter surface and extends peripherally beyond the surface. This extended portion of heat sink is adjacent to an annular expansion chamber of a Joule-Thomson effect cryostat and is cooled by the coolant therein. A plurality of coolant input capillary channels and a plurality of coolant output capillary channels form concentric helical coils and are in a heat exchange relationship, so that the input coolant is cooled by the output coolant. Throttling devices between the expansion chamber and the capillary channels cause expansion of the coolant upon entering and exiting the chamber.

Thus, the present invention provides a new and useful cooling apparatus for an infrared up-convertor that does not obstruct the image paths to and from the up-convertor. Also the cooling apparatus is extremely small in size and mass. The resulting low inertia is very desirable in scanning-type tracking situations. Additionally, operation of the apparatus is not attitude dependent.

Other features and many attendant advantages of the invention will become more apparent upon a reading of the following detailed description together with the drawings, wherein like reference numerals refer to like parts throughout.

BRIEF DESCRIPTION OF THE DRAWING

FIG. 1 is a partially broken-away perspective view of a preferred embodiment of the infrared up-convertor and cooling apparatus of the present invention.

FIG. 2 is a sectional view taken on the line 3-3 of FIG. 1.

FIG. 3 is a sectional view showing another embodiment of the up-convertor.

DETAILED DESCRIPTION OF THE PREFERRED EMBODIMENT

With reference now to the drawings, there is shown in FIG. 1 thereof a partially broken away perspective view of a preferred embodiment of the present invention, and in FIG. 2 thereof a sectional view taken on the line 2—2 of FIG. 1.

An incoming infrared image traveling along incoming image path 14 strikes an up-convertor 10. The up-convertor 10, a disk-shaped electronic array, has a receiving surface 11 fo receiving an infrared image traveling along the incoming image path 14 and an emitting surface 12 for emitting an image along emitted energy path 15. The emitted image corresponds to the image received by the receiving surface 11 but is usually of a shorter wavelength than the received image, thus it is more adaptable for use by conventional light detection systems. If the emitted image is in the visible range, it may be directly observed by a person. Also, the emitted image may be transported, for example by using fiber optics, to a detection and processing location. Electrical connections to the up-convertor 10 are not shown.

A transparent heat sink 16, is located in a conductive heat exchange relationship with the up-convertor 10. In the preferred embodiment, the heat sink 16 is in a conductive heat exchange relationship with the emitting surface 12 of the up-convertor 10. The heat sink 16 is disk-shaped and of larger diameter than the emitting surface 12, thus it has an annular extended portion 17 which is outside of the path of the emitted energy 15. Preferably, the heat sink 16 is deposited on the up-convertor 10 to assure maximum thermal contact and to support the up-convertor 10. However, other methods, such as bonding the up-convertor 10 to the heat sink, 16 may be used to achieve similar structure and heat-transfer results. Instead of being attached to the emitter side 12, the heat sink 16 could be attached to the receiving surface 11'. This embodiment is further illustrated in FIG. 3 which is a cross-sectional view similar to that of FIG. 2. In FIG. 3 an up-convertor 10' is bonded to a heat sink 16' at its receiving surface 11'. In addition, to achieve greater cooling, two heat sinks could be used, one attached to the receiving surface 11' and one attached to the emitting surface 12'.

In addition to being transparent to the emitted light, the heat sink 16 should be capable of attachment to the up-convertor 10, should be thermally compatible with the up-convertor with regard to thermal expansion and contraction characteristics, should be strong enough to support the up-convertor, and should have relatively high thermal conductivity at temperatures around the range of 80° Kelvin. Deposits of substances such as magnesium fluoride (MgF) or zinc selenide (ZnSe) have been found suitable as heat sinks.

A Joule-Thomson effect cryostat 20, located outside of the incoming image path 14 and emitted image path 15, cools the heat sink 16.

The heat sink 16 need not have the extended portion 17 if adequate cooling may be maintained without it. The heat sink 16 need extend peripherally only to such an extent that it may be cooled by the cryostat 20 without the cryostat 20 blocking the path of energy to or from the receiving and emitting surfaces 11, 12 of the up-convertor 10.

An annular expansion chamber 21 is adjacent to the heat sink 16. A plurality of annular, helical, capillary, input channels 23 conduct a gas at high pressure toward the expansion chamber 21; a plurality of annular, helical, capillary, exhaust channels 24 conduct gas away from the expansion chamber 21. An input throttling device 25, such as a small orifice or nozzle, restricts the flow of input gas from each input channel 23 into the expansion chamber. An exhaust throttling device 26, such as an orifice or nozzle, restricts the flow of gas from the expansion chamber 21 to each exhaust channel 24.

The expansion chamber 21 may be composed of several chambers, each having one or more input and exhaust ports. The input and exhaust ports need not be adjacent to one another as shown, but may be staggered.

For operation of the cryostat, a high-pressure gas is fed into the input channels 23. The gas must be of a type which has a positive Joule-Thomson cooling effect, for example, nitrogen or argon gas. typically, pressures are in the range of 2000 to 3000 pounds per square inch. The high-pressure gas spirals thru the input channels 23 and is throttled by the throttling device 26 as it enters the expansion chamber 21. The throttling causes expansion, cooling, and liquification of the gas. The liquified gas then cools the heat sink 16. In this manner, temperatures in the range of 70° to 80° Kelvin can be maintained adjacent to the heat sink 16.

Upon exit from the expansion chamber 21 into the exhaust channels 24, the gas is again throttled by a throttling device 25 and therefore cooled. The annular, helical, capillary, exhaust channels 24 are in a heat exchange relationship with the input channels 23 so that the exhaust gas regeneratively cools the incoming gas.

By cooling the up-convertor 10 in the manner described above, the path of the emitted image 15 is unobstructed. Thus, the emitted image may be directly viewed by a human observer. The unobstructed emitted image path 15 also allows for the use of fiber optics to conduct the emitted image to a more suitable location for further processing.

From the foregoing description, it is seen that the apparatus of the present invention provides a new and useful manner of cooling an up-convertor without obstructing the incoming or emitted energy paths, while also being extremely small in size and mass.

By the term "gas" as used herein and in the appended claims, is meant any fluid material which has a positive Joule-Thomson cooling effect, such as nitrogen or argon.

As various changes may be made in the form, construction, and arrangement of the parts herein, without departing from the spirit and scope of the invention and without sacrificing any of its advantages, it is to be understood that all matter herein is to be interpreted as illustrative and not in any limiting sense.

We claim:

1. An infrared sensitive device embodying an up-convertor having a receiving surface for receiving an infrared image and an emitting surface for emitting a corresponding image at a pre-selected wavelength, and cooling means for the up-convertor, said cooling means comprising:

at least one heat sink for attaching to and covering at least one surface of the up-convertor for conducting heat away from the up-convertor, said heat sink being substantially transparent to radiation at either infrared or said pre-selected wavelength dependent upon whether said heat sink is attached to said receiving or said emitting surface respectively; and cryostat means for cooling the heat sink, said cryostat means operating on a Joule-Thomson effect and being located so that it does not intercept either the received or emitted images.

2. An infrared sensitive device according to claim 1 wherein the cryostat means comprises:

means providing an expansion chamber in a heat exchange relationship with the heat sink for cooling the heat sink, and gas flow conducting means including; input means comprising:
    an input channel for conducting gas to the chamber;
    an inlet at one end of the input channel for connection to a source of high pressure gas; and
    a throttling device at the other end of the input channel and located in a wall of the chamber for directing the gas into the chamber; and
exhaust means comprising;
    an exhaust channel for conducting gas from the chamber;
    an outlet at one end of the exhaust channel for allowing for the exhaust gas to exit; and
    a throttling device at the other end of the exhaust channel and located in a wall of the chamber for directing gas from the chamber into the exhaust channel.

3. An infrared device according to claim 2 wherein the input channel is a helical capillary channel and wherein the exhaust channel is a concentric helical capillary channel immediately adjacent to the input channel and in a heat exchange relationship with the input channel for regeneratively cooling the input gas.

4. An infrared device according to claim 3 wherein the cryostat is located immediately adjacent to the path of light.

5. An infrared sensitive device according to claims 1,2,3 or 4 wherein the heat sink is comprised of magnesium fluoride (MgF2).

6. An infrared sensitive device according to claims 1, 2, 3, or 4 wherein the heat sink is comprised of zinc selenide (ZnSe).

* * * * *